March 29, 1938. E. F. TONEY Re. 20,681

STORE FRONT CONSTRUCTION

Original Filed June 26, 1936 3 Sheets-Sheet 1

INVENTOR.
EDWARD F. TONEY
BY Bradley & Bee
ATTORNEYS.

March 29, 1938. E. F. TONEY Re. 20,681

STORE FRONT CONSTRUCTION

Original Filed June 26, 1936 3 Sheets-Sheet 2

INVENTOR.
EDWARD F. TONEY
BY Brady & Bee
ATTORNEYS.

March 29, 1938. E. F. TONEY Re. 20,681

STORE FRONT CONSTRUCTION

Original Filed June 26, 1936 3 Sheets-Sheet 3

INVENTOR.
EDWARD F. TONEY
BY Bradley & Bee
ATTORNEYS.

Reissued Mar. 29, 1938

Re. 20,681

UNITED STATES PATENT OFFICE 20,681

STORE FRONT CONSTRUCTION

Edward F. Toney, Pittsburgh, Pa., assignor to Pittsburgh Plate Glass Company, Allegheny County, Pa., a corporation of Pennsylvania Original No. 2,075,677, dated March 30, 1937, Serial No. 87,472, June 26, 1936. Application for reissue February 2, 1938, Serial No. 188,349

5 Claims. (Cl. 20—56.4)

Figure 1:
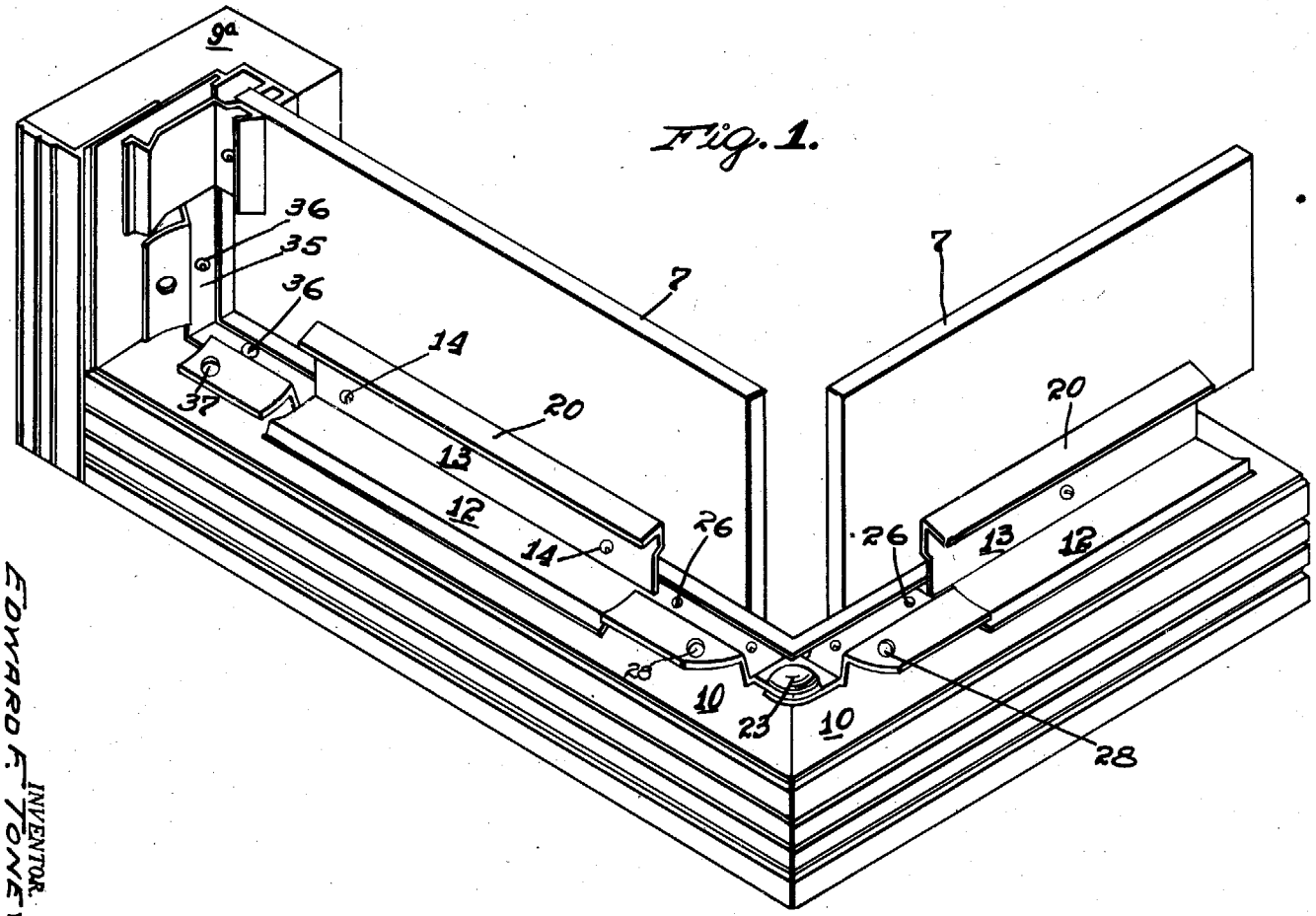
Figure 2:
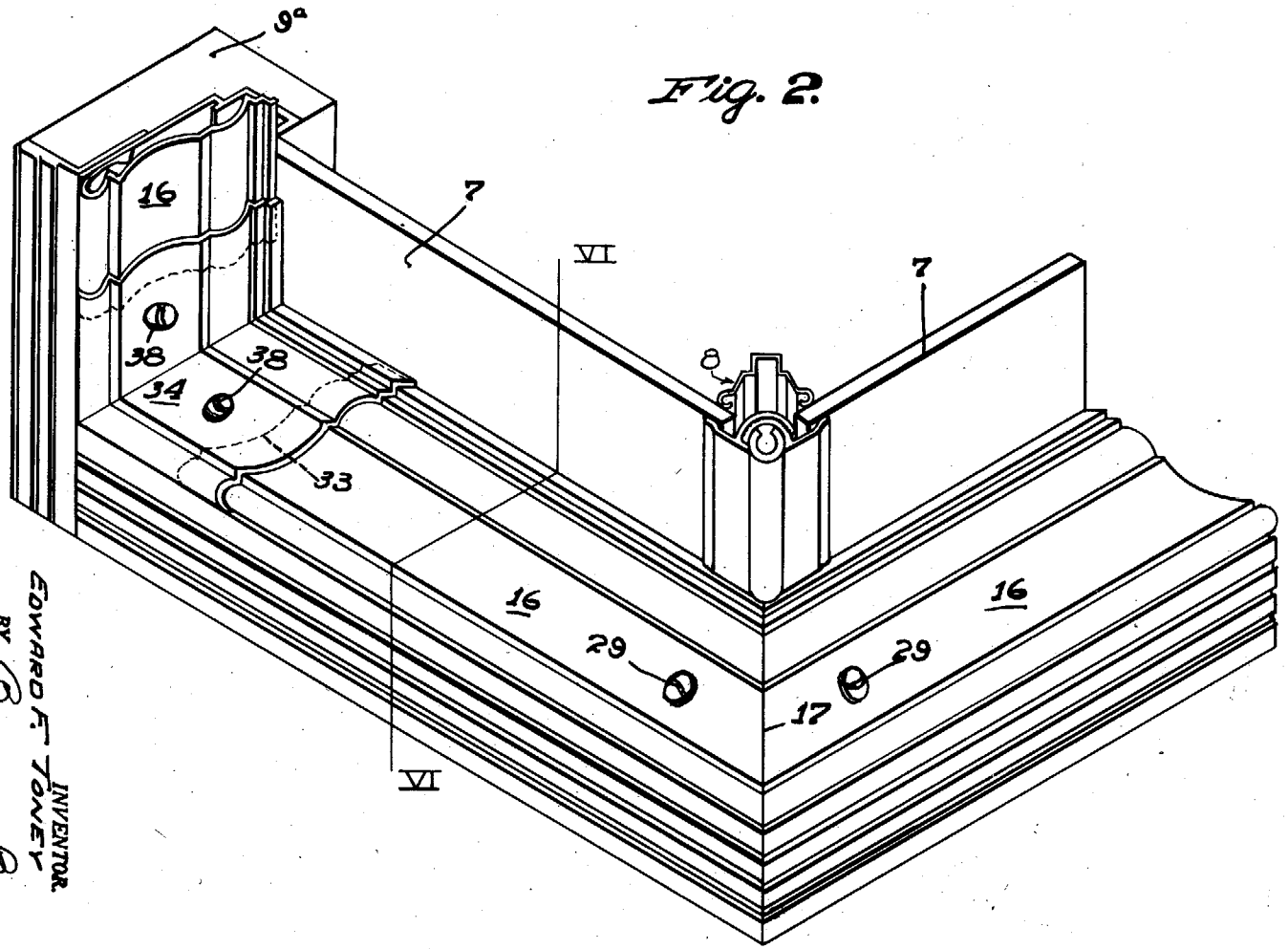
Figure 3:
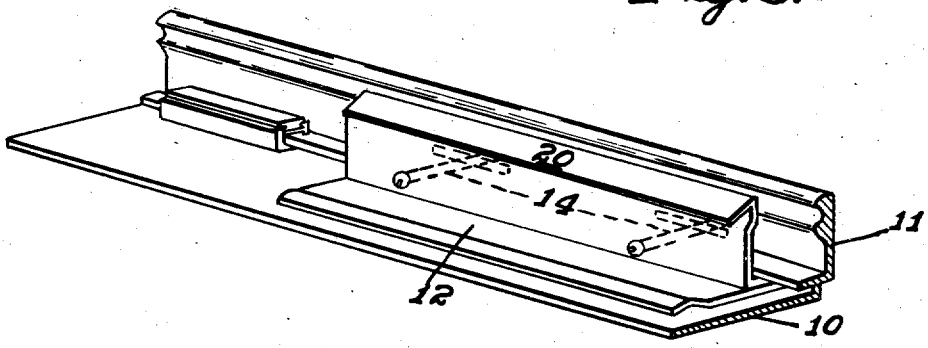
Figure 4:
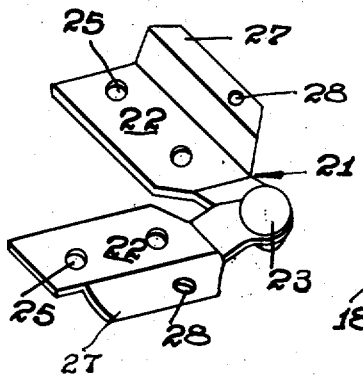
Figure 6:
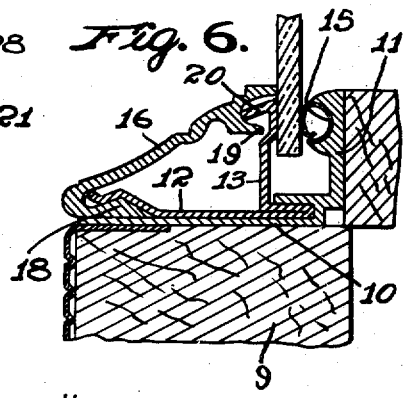
Figure 5:
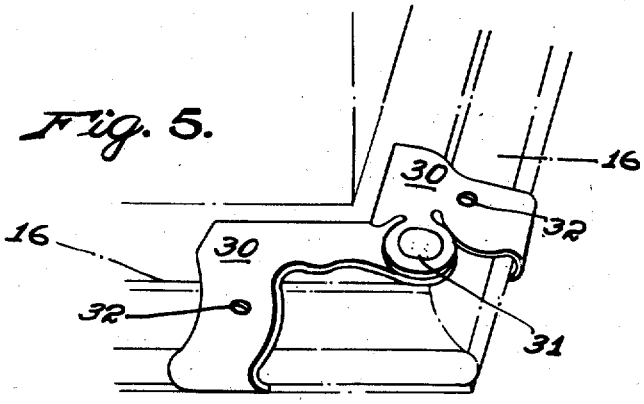

The invention relates to a store front construction employing strips or bars for the reception of the glass of the general type shown in my Patent No. 2,015,769, dated October 1, 1935, and has for its principal objects, the provision of an improved construction wherein the cover strips are held securely at the beveled meeting ends without the necessity of caps to cover such ends, and wherein provision is made for taking care of expansion in the strips incident to temperature changes; the provision of improved bracket securing means for the meeting ends of the cover strips which may be used when the strips are at varying angles to each other, so that one bracket construction will serve for all angles; and the provision of improved means for locating the holes in the cover strip to correspond accurately with the holes in the brackets, all of which, as well as the advantages of the improvement, will be readily understood by those skilled in the art from the detail description following in connection with the drawings, wherein:

Figures 1 and 2 are isometric views, the structure in Fig. 1 having the corner bar and cover plates removed. Figs. 3 to 5 are detail views. And Fig. 6 is a section on the line VI—VI of Fig. 2.

Referring to the drawings, 7, 7 are a pair of glass sheets which approach each other at an angle; 8 is a corner bar at the adjacent vertical edges of the sheets for clamping them together, and 9 is the sash frame which receives the sheets. Seated on the sash frame at the lower edge of each of the glass sheets is a sash bar, preferably of extruded metal, such bars being angular in cross section and comprising a bottom plate 10 and a back plate 11 (Fig. 6). Seated on the bottom plate of each sash bar is an angular member for clamping the edge of the glass sheet and comprising a base plate 12 and a clamping plate 13, such members being secured by screws 14 extending beneath the edges of the glass sheets through slots in the back plate 11 of the sash bar and into the sash frame. The back plate of the sash bar is provided at its upper edge with a longitudinal slot carrying the cushioning member 15 shown in Fig. 6.

Lying over each of the clamping members is a cover strip 16 of ornamental appearance, such cover strips meeting at the bevel 17, as indicated in Fig. 2. The cover strip is, in each case, like that of my patent and is snapped into interlocking engagement with the clamping member by pushing it inward so that the bead 18 fits into the recess beneath the outer edge of the plate 12 and the edge 19 lies beneath the flange 20 at the upper edge of the clamping plate.

In order to anchor the meeting beveled ends of the cover strips securely in position, the hinge clamping brackets 21, shown in Figs. 1 and 4 are employed. The two arms 22, 22 are hinged together on the pivot 23, and each is provided with a pair of screw holes 25. The arms are secured to the sash frame by the screws 26 (Fig. 1) and each arm is provided with a flange 27 having therein a threaded hole 28. When the cover plates are applied, as indicated in Fig. 2, screw holes are cut therethrough in alinement with the holes 28 in the brackets, and the screws 29 are inserted through such holes and screwed into the holes 28 in the bracket arms, thus clamping the cover strip ends in fixed position. In order to locate the holes in the cover plate for the screws 29, the hinge device shown in Fig. 5 is employed. This comprises a pair of arms 30, 30 hinged together on the pivot 31 and adapted to fit the contour of the outer faces of the cover strips. The arms are provided with the openings 32, 32, so located that when the device is applied over the meeting ends of the cover strips, the holes come opposite the holes 28, 28 of the hinge bracket. After the cover strip is marked by a suitable tool fitting the openings 32, 32, the necessary holes are drilled through the cover strips at the points marked by the tool.

Since the beveled ends of the cover strips are anchored to the arms 22 of the fixed hinge brackets, it is necessary to leave the other ends of such strips free to move endwise to take care of expansion incident to temperature changes. The means to accomplish this will be seen by reference to Figs. 1 and 2 wherein the cover strip 16 is shown as terminating at the dotted line 33 short of the vertical sash member 9*a*. The free end of this cover strip and of the vertical cover strip on the sash member 9*a* are covered by an angular cap member 34 having the same contour as the cover strips. This angular cap member 34 is anchored or secured to the angular bracket 35, similar to the angular hinge bracket heretofore described, but lacking the hinge connection between its two arms. This bracket is secured to the sash by the screws 36, 36 (Fig. 1) and is provided with threaded holes 37, 37. Screws 38, 38 (Fig. 2) extend through the cap member 34 and into the screw holes 37, 37. The ends of the two cover strips are thus securely held against in and out movement, but permitted to move endwise. The screws 38 and 29 are preferably provided with ornamental heads requiring a special tool for turning them.

The advantages of the construction will be apparent to those skilled in the art. The corner of the window construction at the bevel 17, which is the most conspicuous portion of the construction, presents a neat appearance because of the absence of the usual angular cap at this point, and at the same time, the angular hinge bracket secures the adjacent ends of the cover strips firmly in position, so that the bevel joint is maintained against separation or distortion. The hinge 23 between the arms 27, 27 of the bracket, permits the use of the one bracket with different constructions regardless of the angle between the glass sheets, and any contraction and expansion of the cover strips is adequately taken care of by the use of the cap members 34 which provide a slip joint for the cover strips at the ends of such strips remote from the beveled ends.

What I claim is:

1. In combination, in a store front construction, a pair of upright glass sheets which approach at two of their vertical edges and lie at an angle to each other, a sash frame into which the sheets are received, an angle clamping member secured on the sash frame at the front of each sheet with one of its flanges engaging the glass sheet, an angle bracket comprising a pair of arms hinged together on the sash frame adjacent the approaching sheet edges having its arms rigidly secured with respect to the sash frame, a cover strip lying above each clamping member and having releasable snap engagement therewith, said cover strips meeting on a bevel above the hinge of the angle bracket, and a securing screw for each of the meeting ends of the cover strips extending therethrough and into one of the arms of the angle bracket, the other end of each of the cover strips being free to move endwise.

2. In combination in a store front construction, a pair of upright glass sheets which approach at two of their vertical edges and lie at an angle to each other, a sash frame into which the sheets are received, an angle clamping member secured on the sash frame at the front of each sheet with one of its flanges engaging the glass sheet, an angle bracket comprising a pair of arms hinged together on the sash frame adjacent the approaching sheet edges having its arms rigidly secured with respect to the sash frame, a cover strip lying above each clamping member and having releasable snap engagement therewith, said cover strips meeting on a bevel above the hinge of the angle bracket, a securing screw for each of the meeting ends of the cover strips extending therethrough and into one of the arms of the angle bracket, the other end of each of the cover strips being free to move endwise, a bracket secured in fixed position on the sash frame at the free end of each cover strip, and a cap plate anchored to each of said last brackets and overlying the free end of the cover strip.

3. In combination with a store front construction comprising a pair of glass sheets which approach at two of their vertical edges and lie at an angle to each other, a sash frame into which the sheets are received, an angle clamping member secured on the sash frame at the front of each sheet with one of its flanges engaging the glass sheet, an angle bracket comprising a pair of arms hinged together on the sash frame adjacent the approaching sheet edges having its arms rigidly secured with respect to the sash frame, a cover strip lying above each clamping member and having releasable snap engagement therewith, said cover strips meeting on a bevel above the angle bracket, and a securing screw for each of the meeting ends of the cover strips extending therethrough and into one of the arms of the angle bracket, a means for locating the openings in the cover strips through which said screws extend comprising a pair of arms hinged together and adapted to fit the contour of the cover strips, said arms each having a hole therethrough adapted to aline with the holes in the angle bracket which receive said screws when the locating means is fitted over the outer faces of the cover strips at the meeting ends thereof.

4. In combination in a store front construction, a pair of upright glass sheets which approach at two of their vertical edges and lie at an angle to each other, a sash frame into which the sheets are received, clamping means on the sash frame for the lower edges of the class sheets, cover strips lying above the clamping means engaged thereby and releasably secured in position with respect to the sash frame, said cover strips meeting on a bevel opposite the meeting edges of the glass sheets, anchoring means for each cover strip adjacent the meeting ends thereof including a screw extending through the strip and securing it in fixed position relative to the sash frame, the other end of one of the cover strips being free to move endwise, a cap plate at the free end of the cover plate overlying such end, and means for anchoring the cap plate releasably in fixed relation with respect to the sash frame.

5. In combination in a store front construction, a pair of upright glass sheets which approach at two of their vertical edges and lie at an angle to each other, a sash frame into which the sheets are received, clamping means on the sash frame for the lower edges of the glass sheets, cover strips lying above the clamping means engaged thereby and releasably secured in position with respect to the sash frame, said cover strips meeting on a bevel opposite the meeting edges of the glass sheets, an angle bracket rigidly secured to the sash frame comprising a pair of arms on the sash frame adjacent the approaching sheet edges, a cover strip lying above each clamping member and having releasable snap engagement therewith, said cover strips meeting on a bevel opposite the meeting edges of the glass sheets, a securing screw for each of the meeting ends of the cover strips extending therethrough and into one of the arms of the angle bracket, the other end of one of the arms of the cover strips being free to move endwise, a bracket secured in fixed position at the free end of said cover strip, and a cap plate anchored to said last bracket and overlying the free end of the cover strip.

EDWARD F. TONEY.